United States Patent
Jun

[19]

[11] Patent Number: 5,959,220
[45] Date of Patent: Sep. 28, 1999

[54] APPARATUS AND METHOD FOR TESTING BELT TENSION OF A BELT DRIVE

[75] Inventor: Hee-il Jun, Suwon, Rep. of Korea

[73] Assignee: Samsung Electronics Co., Ltd., Suwon, Rep. of Korea

[21] Appl. No.: 08/970,108

[22] Filed: Nov. 13, 1997

[30] Foreign Application Priority Data

Jan. 30, 1997 [KR] Rep. of Korea .......................... 97-2716

[51] Int. Cl.$^6$ ...................................................... G01L 1/26
[52] U.S. Cl. ............................... 73/862.391; 73/862.453; 73/862.451
[58] Field of Search ........................ 73/826.321, 862.325, 73/862.194, 862.391, 862.42, 862.451, 862.453, 862.621, 862.625

[56] References Cited

U.S. PATENT DOCUMENTS

| | | | |
|---|---|---|---|
| 1,031,208 | 7/1912 | Thompson | 73/862.453 |
| 3,171,278 | 3/1965 | Haward, Jr. | 73/862.453 |
| 3,403,546 | 10/1968 | Stratton | 73/862.194 |
| 3,839,908 | 10/1974 | Casper | 73/862.471 |
| 4,846,000 | 7/1989 | Steinseifer | 73/862.453 |
| 5,698,796 | 12/1997 | Hirano | 73/862.41 |

*Primary Examiner*—Max H. Noori
*Attorney, Agent, or Firm*—Burns, Doane, Swecker & Mathis, L.L.P

[57] ABSTRACT

An apparatus and a method for testing belt tension of a belt drive for a product such as a washing machine or the like, and more particularly to an apparatus and a method for automatically testing initial belt tension of the belt drive on an assembly line. The belt tension testing apparatus comprises a rod cell for detecting a signal indicating a pressure generated due to a belt tension of a belt of a belt drive; a lift drive for moving the rod cell to a position where the belt is to be pressed by the rod cell; a pressing drive for moving the rod cell to press the belt; measuring means for measuring a distance by which the rod cell is moved by the pressing drive; conveyer means for conveying the belt drive; a fixing support for fixing the belt drive at a working position; and a control and display device for controlling operations of actuators of the lift drive, the pressing drive, and the fixing support, and for determining and displaying whether the belt tension is within an appropriate value range. The apparatus can accurately test the belt tension and thus increases the reliability of the test result, and can improve the productivity of a product to which the belt drive is mounted.

9 Claims, 5 Drawing Sheets

APPARATUS AND METHOD FOR TESTING BELT TENSION OF A BELT DRIVE

BACKGROUND OF THE INVENTION

1. Field of the Invention

The present invention relates to an apparatus and a method for testing belt tension of a belt drive for a product such as a washing machine or the like, and more particularly to an apparatus and a method for automatically testing initial belt tension of the belt drive on an assembly line.

2. Description of the Prior Art

In general, a belt drive transmits power using frictional forces between a belt and belt pulleys. The frictional forces are caused by a belt tension of the belt drive, and the initial belt tension is generated when the length of the belt is a little shorter than the theoretically geometrical length thereof. The belt tension of the belt needs to be controlled to be an appropriate value. That is, in case the initial belt tension is too small, sliding is generated between the belt and the belt pulleys and the power cannot be effectively transmitted between the belt and the belt pulleys. On the other hand, in case the belt tension is too large. excessive loads are exerted to a drive motor. Therefore, the belt tension of the belt drive is conventionally controlled to be a predetermined value in which loads and torques needed in a product to which the belt drive are mounted is considered.

FIG. 1 schematically shows a conventional belt drive of a washing machine. Referring to FIG. 1, in the belt drive, a motor 2 and a reduction gear 3 are fixed to a bracket 1 and are spaced apart from each other. Pulleys 4 and 5 are respectively mounted in surrounded to shafts of the motor 2 and the reduction gear 3, and a belt 6 is wound around the pulleys 4 and 5. An initial belt tension of belt drive is controlled by moving the motor 2 and thus regulating the distance between the motor 2 and the reduction gear 3. The belt drive is mounted on a bottom surface of a washing tub (not shown) upside-down, and the initial belt tension is controlled before the washing machine is assembled.

In order to test the belt tension, as indicated by arrows of FIG. 1, the belt 6 is pressed on both sides by a force, and the displacements d of the belt 6 at the pressed positions are measured by a scale.

However, in the conventional method for testing an initial belt tension of a belt drive, the testing result may depend on pressed positions and directions of the belt and also skillfulness of testing workers, which impair the reliability of the test. As a result, belt tensions of belt drives are occasionally re-controlled after products are completely assembled.

On the other hand, it is preferable to automate assembly lines of a product to increase the productivity thereof. Especially in a washing machine, the belt drive bracket assembly line and the washing tub assembly line for mounting the bracket to the washing tub need to be inlined, and therefore the belt tension should be tested on the assembly line.

However, as above-described, the conventional belt tension testing method, due to its manual characteristics, has been an obstacle to automation of an assembly line, deteriorating productivity of a product.

SUMMARY OF THE INVENTION

Therefore, it is an object of the present invention to provide an apparatus which can automatically test belt tension of a belt drive which is conveyed on an assembly line for a full automation of a product to which the belt drive is mounted.

It is another object of the present invention to provide a method which can accurately test belt tension of a belt drive by mechanical regulations to ensure the reliability of the test.

In order to achieve the first object of the present invention, there is provided an apparatus for testing belt tension of a belt drive, which comprises:

a rod cell for detecting a signal indicating a pressure generated due to a belt tension of a belt of a belt drive;

a lift drive for moving the rod cell to a position where the belt is to be pressed by the rod cell;

a pressing drive for moving the rod cell to press the belt;

measuring means for measuring a distance by which the rod cell is moved by the pressing drive;

conveyer means for conveying the belt drive;

a fixing support for fixing the belt drive at a working position; and a control and display device for controlling operations of actuators of the lift drive, the pressing drive, and the fixing support, and for determining and displaying whether the belt tension is within an appropriate value range.

In order to achieve the second object of the present invention, there is provided a method for testing belt tension of a belt drive, which comprises the steps of:

(i) moving a rod cell for detecting a signal indicating a pressure generated due to a belt tension of a belt of a belt drive to a position where the belt is to be pressed by the rod cell;

(ii) moving the rod cell and pressing the belt by the rod cell;

(iii) measuring a pressure exerted to the rod cell and a distance by which the rod cell is moved by the pressing drive;

(iv) determining whether the belt tension is within an appropriate value range using the pressure and the distance measured.

BRIEF DESCRIPTION OF THE DRAWINGS

The above object and other advantages of the present invention will become more apparent by describing in detail preferred embodiments thereof with reference to the attached drawings in which.

DETAILED DESCRIPTION OF THE INVENTION

Hereinafter, an apparatus and a method for testing belt tension of a belt drive according to a preferred embodiment of the present invention will be explained in detail with reference to accompanying drawings.

Figure 1:
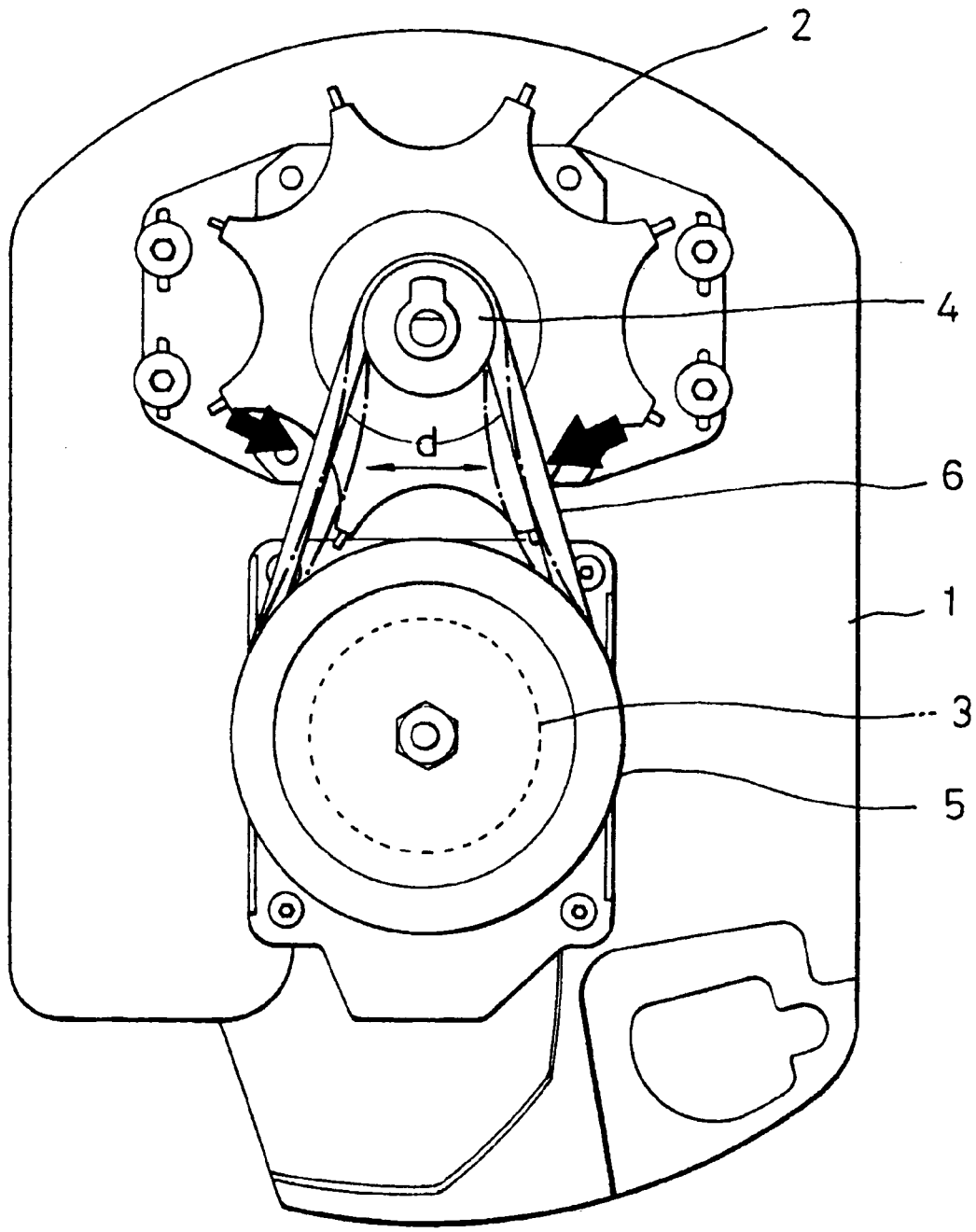
FIG. 1 is a plan view for showing a belt drive for a washing machine and illustrating a conventional belt tension testing method.
Figure 2:
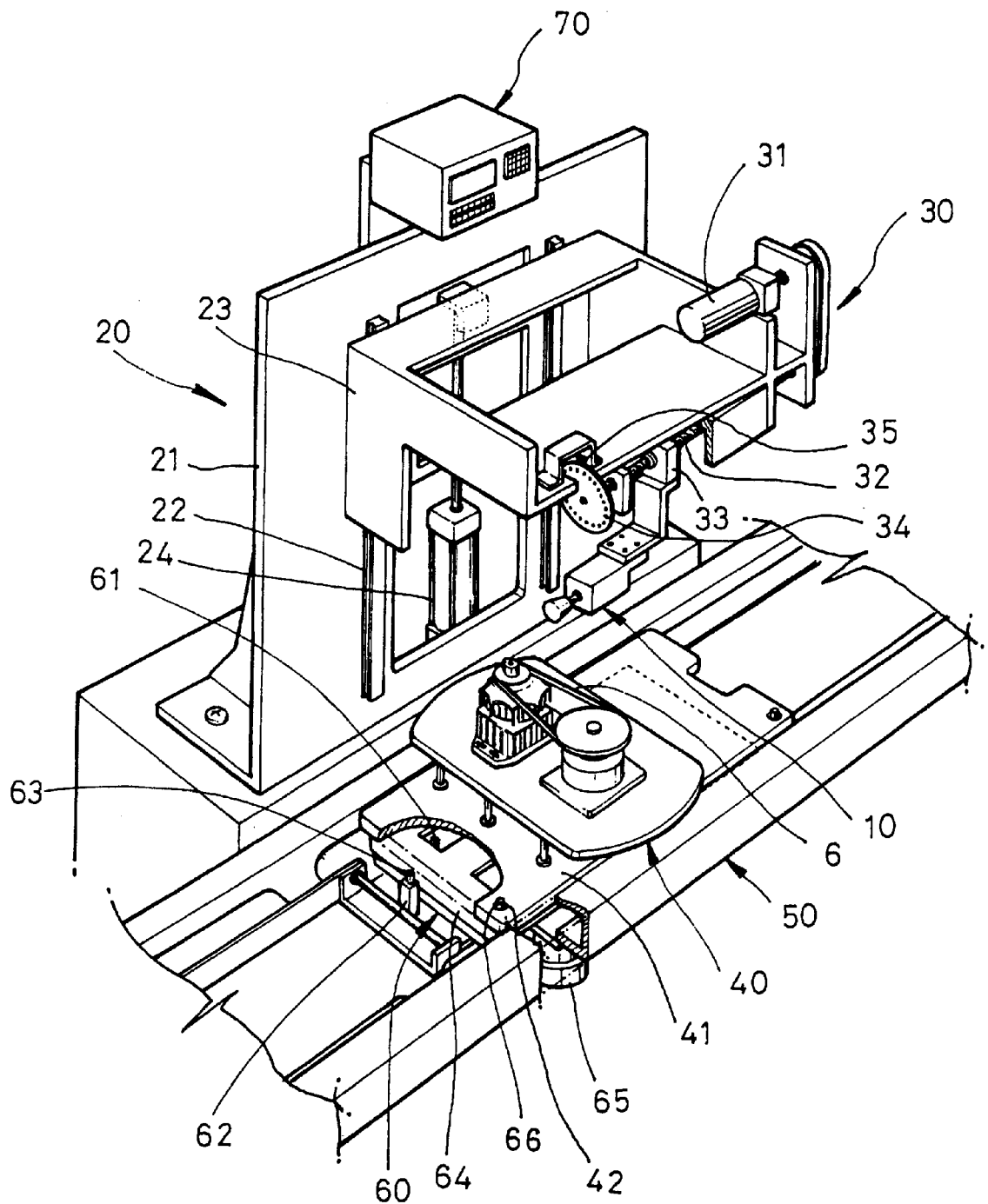
FIG. 2 is a partially cut-away perspective view for showing an apparatus for testing belt tension of a belt drive according to a preferred embodiment of the present invention.

The belt tension testing apparatus according to the present invention, as shown in FIG. 2, includes a rod cell 10 for detecting a signal indicating a pressure generated due to a belt tension of a belt 6 of a belt drive 40, a lift drive 20 which moves the rod cell 10 to a position where the belt 6 is to be pressed by the rod cell 10, a pressing drive 30 which moves the rod cell 10 to press the belt 6, a conveyer 50 which conveys the belt drive 40, a fixing support 60 which fixes the belt drive 40 at a working position, and a control and display device 70 which controls operations of actuators of the lift drive 20, the pressing drive 30, and the fixing support 60 and determines and displays whether the belt tension is within an appropriate value range.

The lift drive 20 includes a support 21, a lift member 23 which is mounted to a guide rail 22 formed in the support 21 so as to be movable upward and downward, an air cylinder 24 which moves the lift member 23 upward and downward. The lift drive 20 moves the pressing drive 30 downward to move the rod cell 10 to the working position.

The pressing drive 30 includes a motor 31, a screw shaft 32 which is rotated by the motor 31; a block 33 which is mounted to the screw shaft 32 so as to be linearly moved when the screw shaft 32 is rotated, a rotary circular encoder plate 34 which is mounted to one end of the screw shaft 32 so as to be rotated together with the screw shaft 32, and a sensor 35. The rod cell 10 is mounted to the block 33 so as to be moved together with the block 33, and the moving direction of the rod cell 10 is perpendicular to the belt 6 of the belt drive 40.

The fixing support 60 includes a sensor 61 which detects a pallet 41 to which the belt drive 40 is mounted at a position near the working position, an air cylinder 62 which is operated according to a signal of the sensor 61, a fixing support plate 64 which has a fixing boss 66 into which can be inserted into a hole 42 of the pallet blocked by a stopper rod 63 of the air cylinder 62, and an air cylinder 65 which moves the fixing support plate 64 upward and downward. That is, if the pallet 41 is blocked by the stopper rod 63, when the air cylinder 65 is operated, the fixing boss 66 of the fixing support plate 64 is inserted into the hole 42 of the pallet 41 and then lifts the pallet 41 by a distance, and thus the position of the pallet 41 becomes fixed.

Hereinafter, the operation of the belt tension testing apparatus and a method for testing belt tension of a belt drive according to a preferred embodiment of the present invention will be explained with reference to FIGS. 2 through 5.

Referring to FIG. 2, the pallet 41 is blocked on the conveyer 50 by the stopper rod 63 which is operated by the sensor 61 and the air cylinder 62 of the fixing support 60. The pallet 41 is lifted by the fixing support plate 64 which is lifted by a distance by the air cylinder 65, and in this state the air cylinder 24 of the lift drive 20 is operated(S1).

Figure 3:
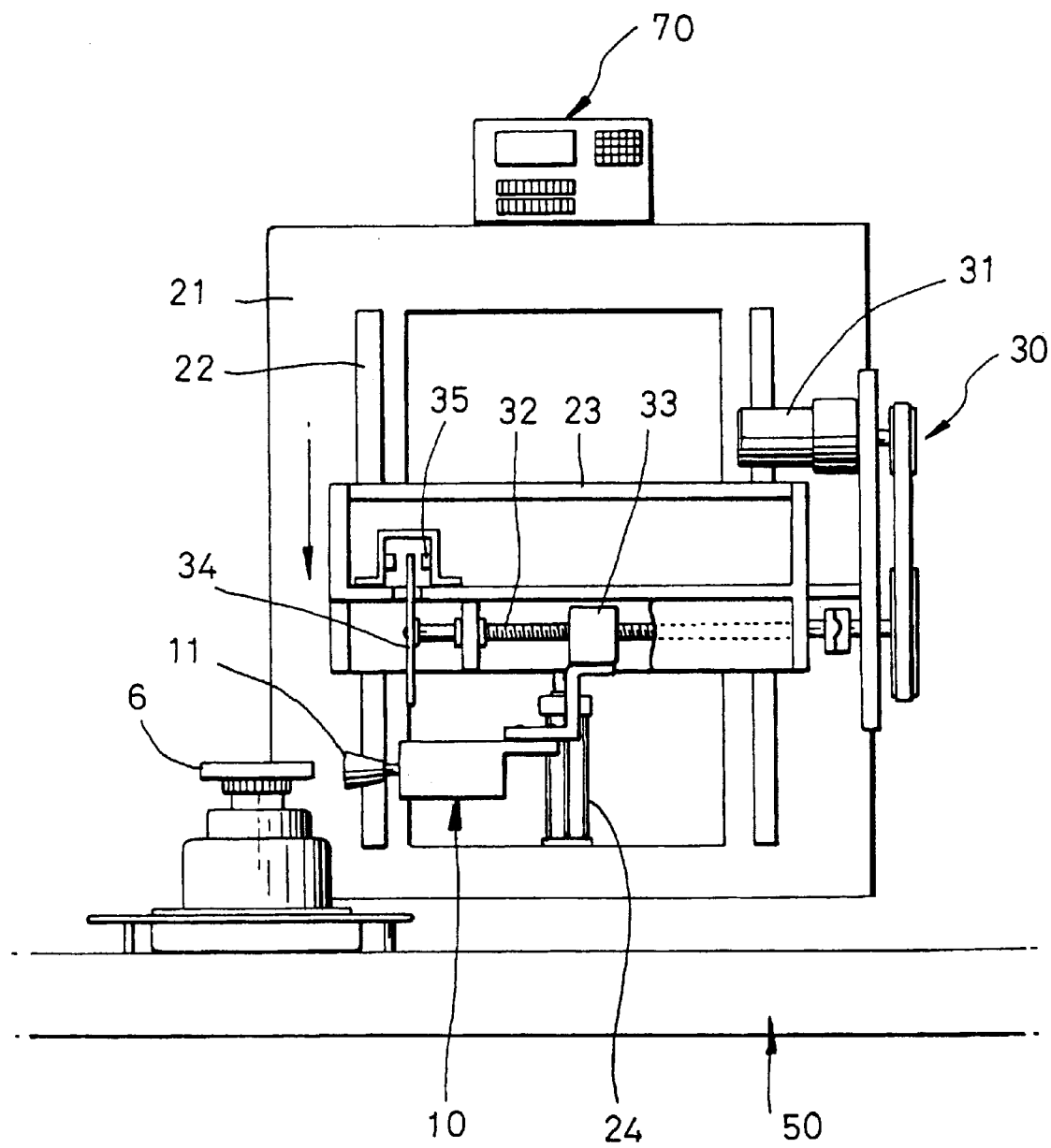
FIG. 3 is a front view in which a rod cell is moved to a working position by the belt tension testing apparatus according to the preferred embodiment of the present invention.

Then, as shown in FIG. 3, the lift member 23 which supports the pressing drive 30 is moved downward along the guide rail 22 of the support 21, and an end of a rod button 11 of the rod cell 10 is moved down to the working position, i.e., at the position where the belt 6 is located. In this condition, the motor 31 of the pressing drive 30 drives and moves the rod cell 10 to press the belt 6(S2).

Figure 4:
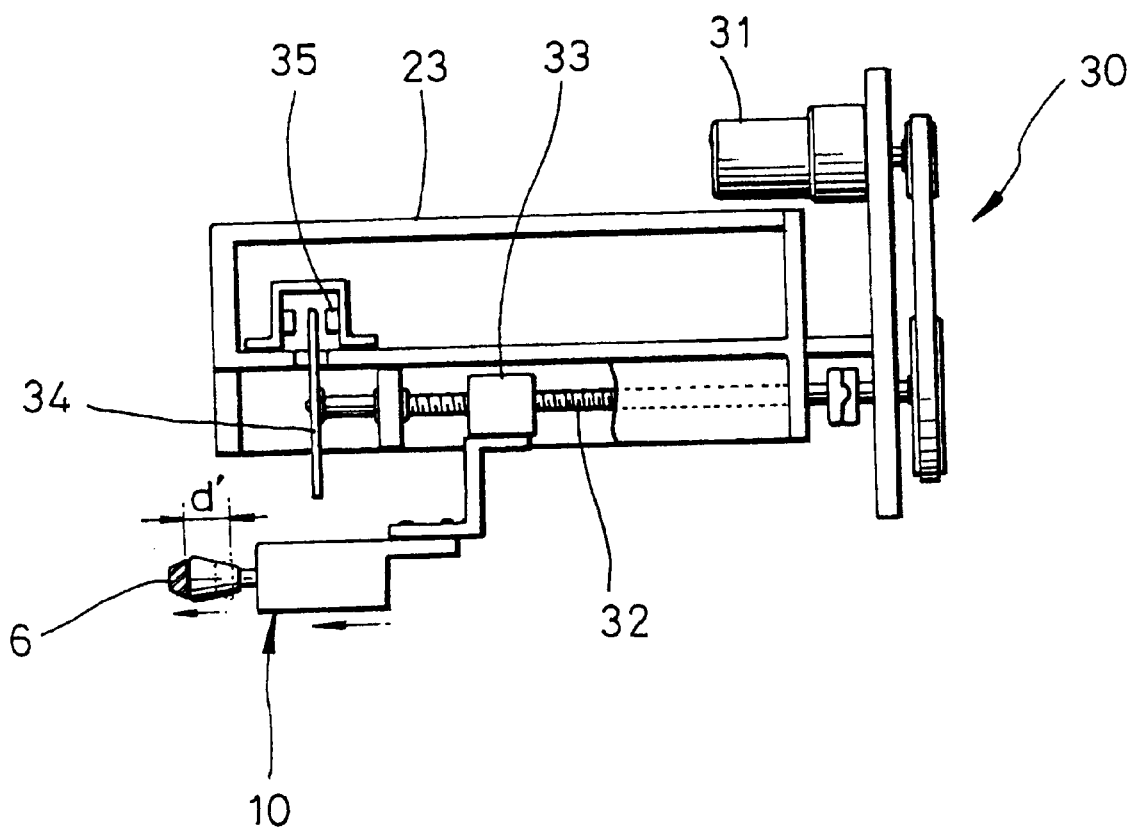
FIG. 4 is a front view in which the rod cell is pressed by the belt tension testing apparatus according to the preferred embodiment of the present invention.
Figure 5:
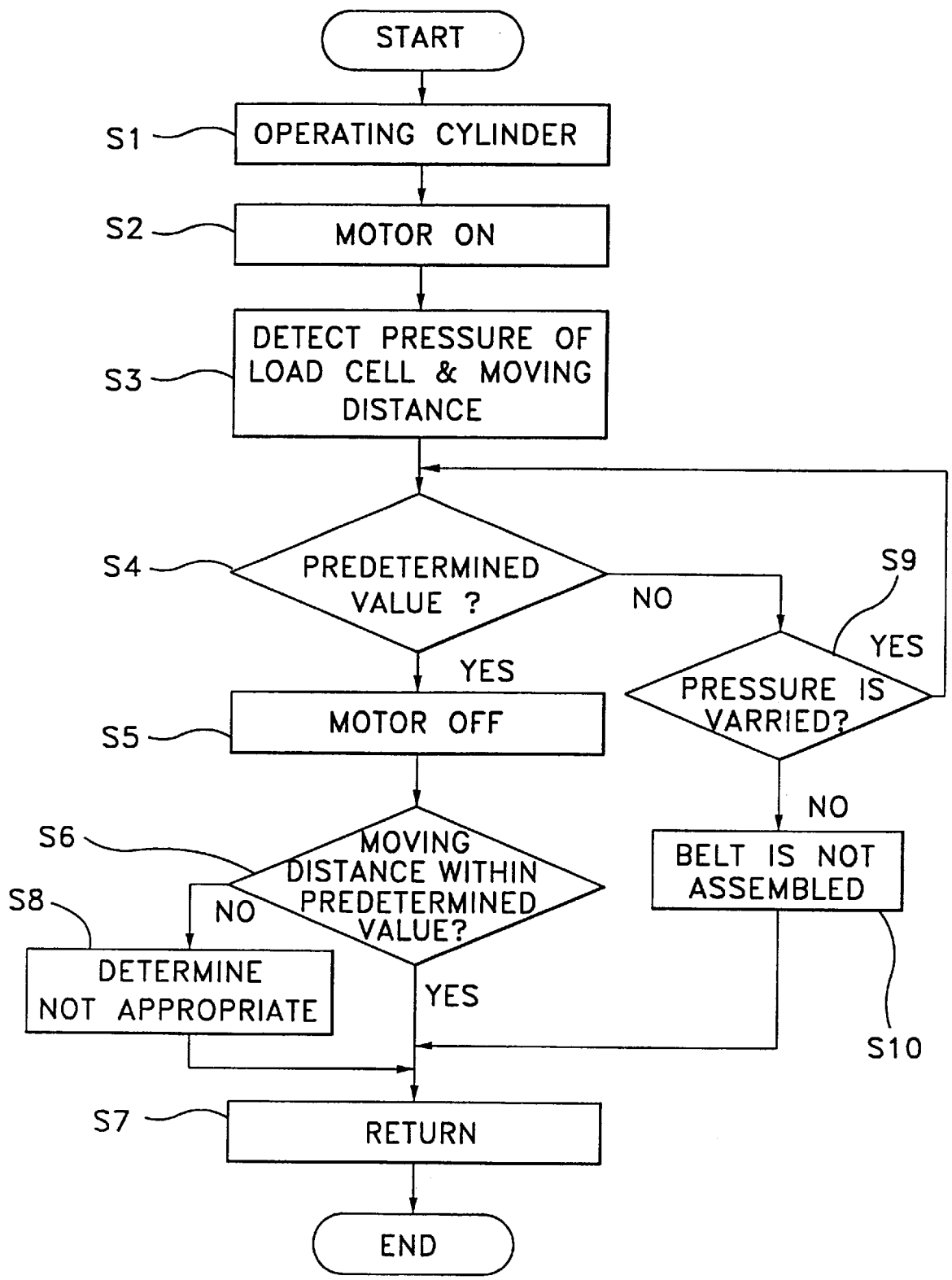
FIG. 5 is a block diagram for showing the belt tension testing apparatus according to the preferred embodiment of the present invention.

When the screw shaft 32 is rotated by the motor 31, the block 33 is moved toward the belt 6 along the length of the screw shaft 32 as shown in FIG. 4. Then, the rod button 11 of the rod cell 10 moves and presses the belt 6, and a pressure caused by the reaction force of the belt 6 is applied to the rod button 11 of the rod cell 10. The present invention determines the pressure using a signal from the rod cell 10, and measures the moving distance of the rod cell 10, i.e., the displacement of the belt 6 which is proportional to the RPM of the rotary circular encoder plate 34 which is rotated together with the screw shaft 32 as shown in FIG. 4. The RPM of the encoder plate 34 is detected by the sensor 35(S3).

The present invention determines whether the measured pressure reaches a predetermined value(S4), and stops the operation of the motor 31 when the pressure reaches the predetermined value(S5), and then determines whether the measured distance(moving distance) is within a predetermined value range(S6). In case the distance is with the predetermined value range, the present invention considers the belt tension to be appropriate and finishes the testing and returns to the initial state(S7).

In case the measured pressure is determined to reach the predetermined value and the distance is out of the predetermined value range, the present invention considers the belt tension not to be appropriate(S8) and finishes the testing. In case the measured pressure does not reach the predetermined value, the present invention determines whether the pressure detected by the rod cell 10 is varied(S9), and determines that the belt 4 is not assembled when the pressure variation is not detected(S10) and finishes the testing.

As above-described, according to the present invention, a belt tension of a belt drive mounted to a product such as a washing machine or the like can be automatically tested on an assembly line, and in particular the belt tension is determined with accuracy, thereby preventing stopping of the assembling processes due to an inappropriate belt tension. Therefore, the productivity is improved by automation of assembly lines, thereby increasing the reliability of the testing result.

Further, according to the present invention, the belt is automatically pressed, so the displacement of the belt is accurately measured.

Although the preferred embodiments of the invention have been described, it is understood that the present invention should not be limited to these preferred embodiments, but various changes and modifications can be made by one skilled in the art within the spirit and scope of the invention as hereinafter claimed.

What is claimed is:

1. An apparatus for testing belt tension of a belt drive, which comprises:

a rod cell for detecting a signal indicating a pressure generated due to a belt tension of a belt of a belt drive;

a lift drive for moving the rod cell to a position where the belt is to be pressed by the rod cell;

a pressing drive for moving the rod cell to press the belt;

measuring means for measuring a distance by which the rod cell is moved by the pressing drive;

conveyer means for conveying the belt drive;

a fixing support for fixing the belt drive at a working position; and a control and display device for controlling operations of actuators of the lift drive, the pressing drive, and the fixing support, and for determining and displaying whether the belt tension is within an appropriate value range.

2. An apparatus for testing belt tension of a belt drive according to claim 1, wherein the lift drive comprises:

a support including a guide rail;

a lift member mounted to the guide rail so as to be movable upward and downward, the pressing drive being supported by the lift member; and an actuator for moving the lift member upward and downward.

3. An apparatus for testing belt tension of a belt drive according to claim 1, wherein the pressing drive comprises:

an actuator;

a screw shaft rotated by the actuator; and a block mounted to the screw shaft so as to be linearly moved when the screw shaft is rotated, the rod cell being mounted to the block so as to be moved together with the block.

4. An apparatus for testing belt tension of a belt drive according to claim 1, wherein the measuring means comprises:

a rotary circular encoder plate mounted to the screw shaft so as to be rotated together with the screw shaft; and a sensor for detecting an RPM of the encoder plate from which the distance by which the rod cell is moved is measured.

5. An apparatus for testing belt tension of a belt drive according to claim 1, wherein the actuator of the pressing drive is operated until the pressure detected by the rod cell reaches a predetermined value.

6. An apparatus for testing belt tension of a belt drive according to claim 1, wherein a direction along which the rod cell is moved by the pressing drive is perpendicular to the belt of the belt drive.

7. An apparatus for testing belt tension of a belt drive according to claim 1, wherein the fixing support comprises:

a sensor for detecting a pallet of the belt drive at a position near the working position;

a first actuator including a stopper rod for blocking the pallet according to a signal of the sensor;

a fixing support plate for moving upward the blocked pallet and fixedly supporting the pallet; and a second actuator for moving upward and downward.

8. A method for testing belt tension of a drive belt which comprises the steps of:

(i) moving a detecting assembly comprising a motor, a shaft driven by the motor, and a rod cell mounted on the shaft, to a position where the drive belt can be pressed by the rod cell, the rod cell being movable toward the drive belt in response to rotation of the shaft;

(ii) actuating the motor to rotate the shaft for moving the rod cell toward the drive belt;

(iii) sensing a pressure applied to the rod cell during step (ii);

(iv) deactivating the motor in response to a predetermined pressure on the rod cell being sensed in step (iii);

(v) sensing a number of rotations of the shaft for determining a distance traveled by the rod cell; and (vi) determining that the tension on the drive belt is acceptable if the distance determined in step (v) is within a predetermined range.

9. A method for testing belt tension of a belt drive according to claim 8, further including determining that the belt tension test is impossible if the pressure of the rod cell does not vary during step (iii).

* * * * *